United States Patent
Berglund

(10) Patent No.: US 6,637,203 B2
(45) Date of Patent: Oct. 28, 2003

(54) METHOD AND ARRANGEMENT FOR REGULATING CRANKSHAFT ROTATIONAL SPEED

(75) Inventor: Sixten Berglund, Torslanda (SE)

(73) Assignee: Volvo Lastagnar AB, Göteborg (SE)

( * ) Notice: Subject to any disclaimer, the term of this patent is extended or adjusted under 35 U.S.C. 154(b) by 0 days.

(21) Appl. No.: 10/065,931

(22) Filed: Dec. 2, 2002

(65) Prior Publication Data

US 2003/0106540 A1 Jun. 12, 2003

Related U.S. Application Data

(63) Continuation of application No. PCT/SE01/01168, filed on May 23, 2001.

(51) Int. Cl.$^7$ ................................................ F02B 33/44
(52) U.S. Cl. .................... 60/605.1; 123/559.1; 123/561
(58) Field of Search ................................ 60/597, 605.1, 60/609; 123/559.1, 561, 564

(56) References Cited

U.S. PATENT DOCUMENTS

| | | | |
|---|---|---|---|
| 4,907,549 A | * | 3/1990 | Morikawa et al. ...... 123/65 BA |
| 5,109,826 A | * | 5/1992 | Kato ........................... 123/564 |
| 5,186,081 A | * | 2/1993 | Richardson et al. .......... 477/33 |
| 5,403,244 A | * | 4/1995 | Tankersley et al. ........... 477/20 |
| 5,875,766 A | | 3/1999 | Ozawa ........................ 123/561 |
| 5,890,468 A | | 4/1999 | Ozawa ........................ 123/561 |
| 6,058,916 A | * | 5/2000 | Ozawa .................... 123/559.3 |

* cited by examiner

Primary Examiner—Hoang Nguyen
(74) Attorney, Agent, or Firm—Howrey Simon Arnold & White LLP

(57) ABSTRACT

Method and arrangement for regulating the rotational speed of a crankshaft included in an internal combustion engine during a gear changing process of a gearbox connected to the internal combustion engine. The arrangement includes a compressor mounted in connection with the air inlet of the internal combustion engine. A transmission having a variable gear ratio is located between the crankshaft and a driving shaft arranged in connection with the compressor, and a control unit is arranged to control the gear ratio between the crankshaft and the compressor. When changing from a higher to lower gear, the control unit is arranged to control the gear ratio between crankshaft and compressor so that the gear ratio between these components is reduced, and wherein moment of inertia is transferred from compressor to crankshaft resulting in an acceleration of the crankshaft.

9 Claims, 2 Drawing Sheets

METHOD AND ARRANGEMENT FOR REGULATING CRANKSHAFT ROTATIONAL SPEED

CROSS REFERENCE TO RELATED APPLICATIONS

This application is a continuation patent application of International Application No. PCT/SE01/01168 filed May 23, 2001 which was published in English pursuant to Article 21(2) of the Patent Cooperation Treaty, and which claims priority to Swedish Application No. 0002043-8 filed May 31, 2000. Both applications are expressly incorporated herein by reference in their entireties.

BACKGROUND OF INVENTION

TECHNICAL FIELD: The present invention relates to an arrangement for regulating the rotational speed of a crankshaft included in an internal combustion engine during a gear changing process, as well as a method for regulating the rotational speed of a crankshaft included in an internal combustion engine during a gear changing process of a gearbox connected to the internal combustion engine. More particularly, the invention relates to a method and an arrangement for regulating the rotation axis of a crankshaft included in an internal combustion engine, as well as a gear changing process in a gearbox connected to the internal combustion engine in which the rotational speed of the crankshaft is influenced by the gear ratio in a transmission between the crankshaft and a mass-moment of inertia driven via that transmission. Preferably, a compressor is arranged in connection with the air inlet of the internal combustion engine. The invention also relates to an arrangement for regulating the rotational speed of a shaft driven by an engine during a gear changing process.

BACKGROUND OF THE INVENTION: There is an increased utilization of automatic and semi-automatic gearboxes in commercial vehicles. Such gearboxes function according to the same principle as conventional gearboxes, but with the difference that the gear changing process is performed by means of actuators instead of manually by means of mechanical gear shift levers. FIG. 1 of the accompanying drawings graphically illustrates the principal stages that are passed when changing from a lower to a higher gear in such a gearbox. The diagram in FIG. 1 shows the rotational speed of a crankshaft included in the internal combustion engine as a function of time during a gear changing process. Stage "a" shows a normal operating condition before a gear changing process is initiated. Stage "b" shows torque reduction of the engine after having initiated a gear changing process. Stage "c" shows disengagement of a clutch in order to disengage the engine from the gearbox. Stage "d" shows reduction of the rotational speed of the crankshaft in order to adapt the crankshaft rotational speed to a new selected gear ratio. Stage "e" shows renewed engagement of a clutch. Stage "f" shows torque increase of the engine, and stage "g" once again shows a normal operating condition after having performed a change of a higher gear.

In a similar way, the principal stages that are passed when changing from a higher to a lower gear in such a gearbox are shown in a diagram in FIG. 2. Stage "g" shows a normal operating condition before a gear changing process is initiated. Stage "h" shows torque reduction of the engine after having initiated a gear changing process. Stage "i" shows disengagement of a clutch in order to disengage the engine from the gearbox. Stage "j" shows increase of the rotational speed of the crankshaft in order to adapt the crankshaft rotational speed to a new selected gear ratio. Stage "k" shows renewed engagement of a clutch. Stage "l" shows torque increase of the engine, and stage "m" once again shows a normal operating condition after having performed the change of gear to a lower gear.

In order to obtain a vehicle with good running characteristics, it is of importance that a gear changing process is as fast as possible. This is of particular importance when changing a higher gear while a vehicle is being driven uphill, resulting in retardation of travel by gravity on the vehicle. Should the gear changing process be too slow, changing gears will become impossible since the vehicle is retarded to such an extent that a new desired gear will not be suitable once the gear is engaged. Extended gear change processes are also detrimental when changing from a higher to a lower gear. Accordingly, extended gear changing processes result in poor running characteristics and impaired fuel economy.

Accordingly, in order to ensure that a gear changing process is fast, the engine speed should be actively adapted to the engine speed corresponding to the speed of the vehicle and the desired gear ratio during the gear changing process. It is previously known from SE 502 154 to adapt the engine speed by means of applying an exhaust gas brake during a changing-up process, wherein a fast reduction of the engine speed is achieved. This system, however, lacks the possibility to rapidly adapt the engine speed upwards by means of increasing the rotational speed of the engine when downshifting.

From U.S. Pat. No. 5,638,271, a system is known for facilitating the gear changing process of a vehicle by adapting the engine speed when changing from a lower to a higher gear, as well as when changing from a higher to a lower gear. The increase or reduction of the engine speed is performed by means of controlling fuel injection in order to accomplish the desired engine speed. The system according to U.S. Pat. No. 5,638,271, however, lacks an active retardation of the engine speed since the engine speed is reduced solely by means of controlling the fuel injection process.

SUMMARY OF INVENTION

An object of the present invention is to provide a system where the engine speed can be adapted to the engine speed corresponding to the vehicle speed and desired gear ratio, where the engine speed both can be actively increased as well as actively reduced, and where a single system is utilized both when increasing the engine speed and when reducing the engine speed. A further object of the invention is to provide a system where energy is conserved during a gear changing process, meaning that energy consumed for retarding the crankshaft in order to accomplish synchronization during a gear changing process can be recovered into a driving torque when the gear has been shifted.

A further object of the invention is to provide a method for regulating the rotational speed of a crankshaft included in an internal combustion engine during a gear changing process of a gearbox connected to the internal combustion engine. In this method, the engine speed can be adapted to the engine speed corresponding to the vehicle speed and desired gear ratio, where the engine speed can be both actively increased, as well as actively decreased, and in which a single system is utilized both when increasing the engine speed and when reducing the engine speed.

Still another object of the invention is to provide a gear changing process for a gearbox arranged at an internal combustion engine where the engine speed can be adapted to the engine speed corresponding to the vehicle speed and the desired gear ratio, where the engine speed can be both actively increased, as well as actively reduced, and where a single system is utilized both when increasing the engine speed and when reducing the engine speed.

BRIEF DESCRIPTION OF DRAWINGS

In the following, a number of embodiments of the invention will be described in detail with reference to the attached drawings, in which.

DETAILED DESCRIPTION

Figure 1:
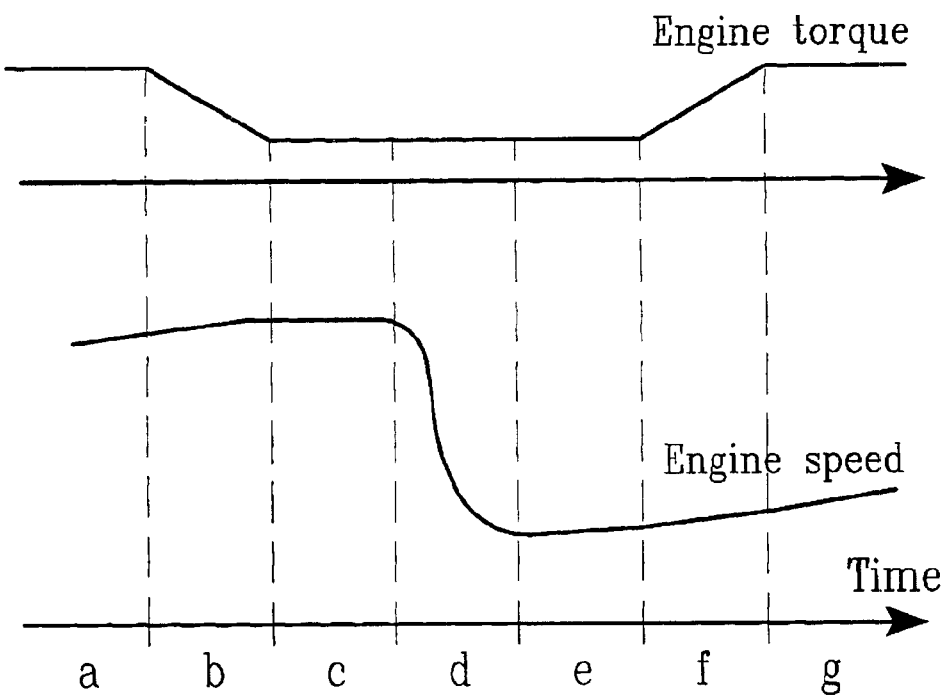
FIG. 1 is a graphical representation of a gear changing process from a lower to a higher gear.

As mentioned in the foregoing background description of the invention, FIG. 1 shows a graphical diagram with the rotational speed of a crankshaft (engine speed) of an internal combustion engine as a function of time during a gear changing process be shown via the lower curve, and corresponding torque magnitudes being simultaneously shown via the upper curve. Stage "a" shows a normal operating condition before an up-shift gear changing process is initiated. Stage "b" shows torque reduction of the engine after having initiated a gear changing process. Stage "c" shows disengagement of a clutch in order to disengage the engine from the gearbox. In this stage, the fuel injection is switched off in order to ensure that the engine speed does not increase. Stage "d" shows reduction of the rotational speed of the crankshaft in order to adapt the crankshaft rotational speed to a newly selected (higher) gear ratio. The length in time of this period determines the rapidity of the gear changing process to a great extent. Accordingly, the gear changing process can be made faster by means of reducing the length of stage "d". Stage "e" shows renewed engagement of a clutch. Stage "f" shows a torque increase of the engine, and stage "g" once again shows a normal operating condition after having performed the upward change in gears.

Figure 2:
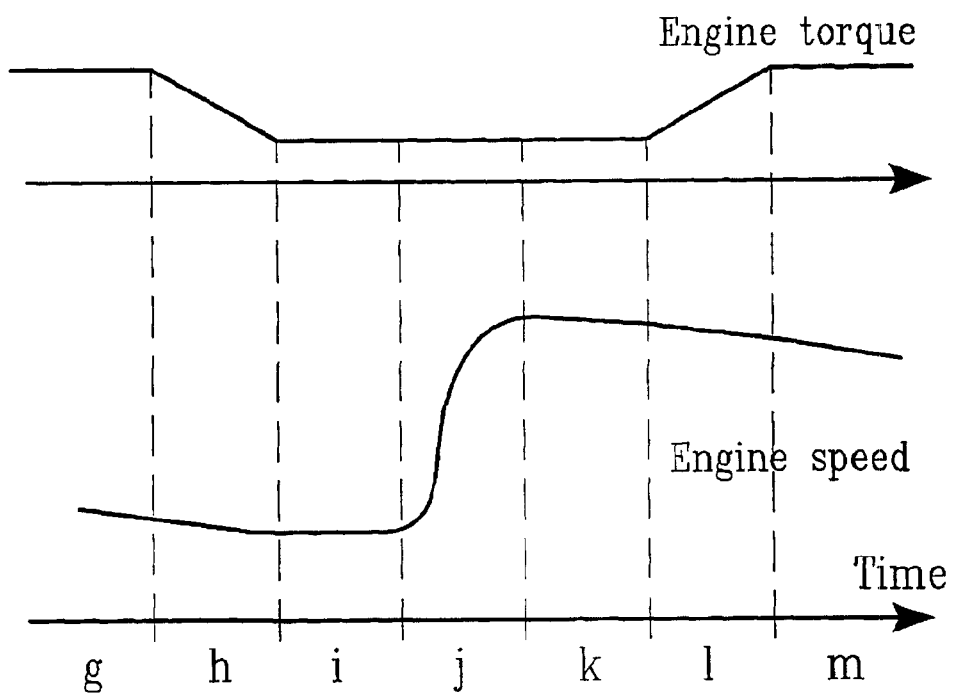
FIG. 2 is a graphical representation of a gear changing process from a higher to a lower gear.

As mentioned in the foregoing background description of the invention, FIG. 2 shows a graphical diagram of the principal stages that are passed when changing from a higher to a lower gear in such a gearbox. Stage "g" shows a normal operating condition before initiating a down-shift gear changing process. Stage "h" shows torque reduction of the engine after having initiated a gear changing process. Stage "i" shows disengagement of a clutch in order to disengage the engine from the gearbox. Stage "j" shows an increase of the rotational speed of the crankshaft in order to adapt the crankshaft rotational speed to the newly selected gear ratio. Stage "k" shows engagement of a new clutch. Stage "l" shows a torque increase of the engine, and stage "m" once again shows a normal operating condition after having performed change to the lower gear.

Figure 3:
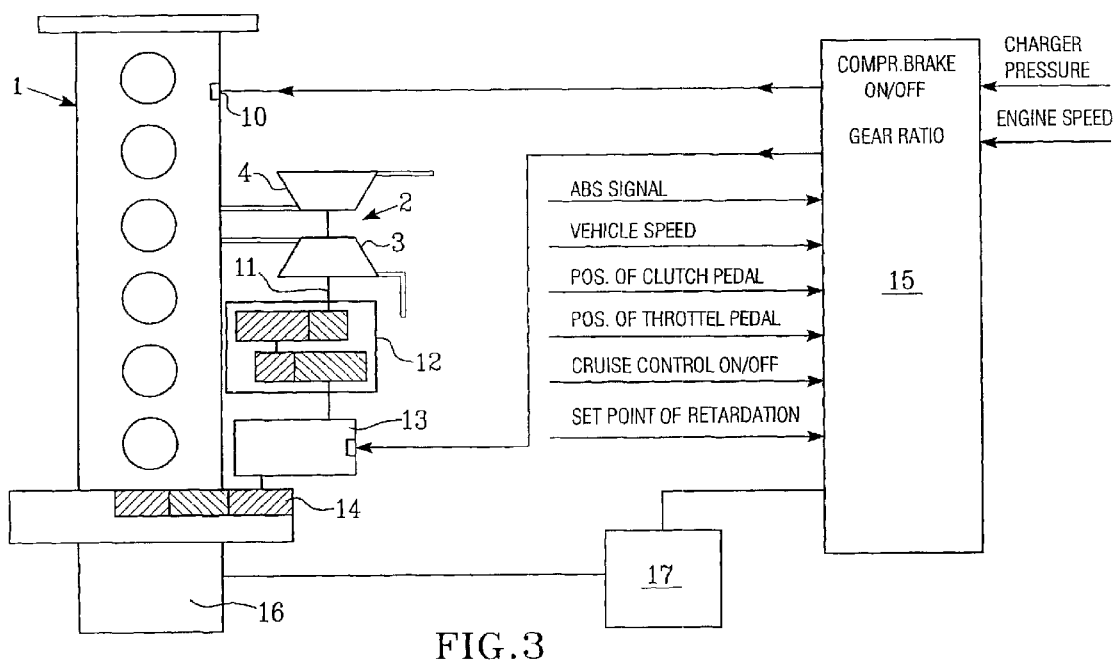
FIG. 3 is a schematic representation of an internal combustion engine where a variable transmission is coupled between an output shaft from the engine and a compressor arranged in the engine inlet.

FIG. 3 shows a six-cylinder diesel engine 1 having a turbocompressor 2 that has a turbine element 3 and a compressor element 4. The turbocompressor 2 is rigidly supported by a bracket screwed into the engine block, and has its exhaust gas inlet in the turbine element 3 connected to the exhaust manifold of the engine via a flexible connection such as a bellows system which allows a certain displacement caused by heat expansion of the outlet of the exhaust manifold in relation to the inlet of the turbine element. The compressor element 4 is connected to the induction air manifold in a conventional way via an intermediate induction air cooler.

The engine 1 can be equipped with a compression brake device 10, schematically indicated, which can be of the type disclosed and described in SE 466 320, and by means of which the cylinders of the engine can be connected to the exhaust manifold during the later part of the compression stroke in order to increase the engine-brake power. Accordingly, reference is made to SE 466 320 for a more detailed description of the design and function, as well as the corresponding U.S. Pat. No. 5,146,890 which is hereby expressly incorporated by reference.

The rotor shaft 11 of the turbocompressor 2 is connected to the crankshaft of the engine via a high-speed driving gear 12, a transmission 13 preferably with a infinitely variable speed (so-called CVT), and a low-speed driving gear 14. A disengageable coupling (not shown), by means of which the driving connection between the rotor shaft 11 and the crankshaft can be disconnected, can be included in the chain of components from the rotor shaft 11 to the crankshaft. In the high-speed driving gear 12, a first rotational speed reduction, from the working rotational speed of the turbocharger unit which is about 100,000 rpm down to the working rotational speed of the CVT-transmission 13 which is about 10,000 rpm, is obtained. In the low-speed driving gear 14, the rotational speed is reduced further down to the working rotational speed of the crankshaft that is operating at about 2,000 rpm.

By means of fixing the turbocharger 2 to the engine block in the above-described way, the risk of a change in the alignment between the shafts of the turbocharger and the driving gear 12 is eliminated, something which otherwise could become the consequence of differences in the heat expansion between the exhaust manifold and the engine block in case the turbocharger was rigidly suspended from the exhaust manifold in a conventional way.

A control unit 15, which preferably is a microprocessor, provides output signals for engagement or disengagement of the coupling (not shown) which connects the drive of the turbocharger 2 from the engine crankshaft and which can be incorporated into the CVT-transmission 13. Furthermore, the control unit 15 emits a signal for setting the gear ratio of the transmission 13 depending on a number of engine and vehicle parameters which are fed to the control unit from sensors which are known per se and not described in greater detail. Furthermore, the gear ratio is controlled in order to be variable during a gear shifting process of a gearbox 16 connected to the internal combustion engine, as will be described in greater detail below.

When the gear changing process is initiated, the system exhibits a rotational speed $R_{engine}$ of a crankshaft located in the internal combustion engine, a moment of inertia $J_{engine-initial}$ of a crankshaft located in the internal combustion engine, a gear ratio $G_{initial}$ of the variable transmission 13 located between the crankshaft of the engine 1 and the compressor 4 and turbine 3, and a rotational speed $R_{compressor-initial}$ and a moment of inertia $J_{compressor-initial}$ of the compressor 4 and the turbine 3.

Initially, the control unit 15 receives a message indicating that a gear change is to be performed. This message can originate from a control unit, which automatically selects gears in accordance with a program that is to give the desired running characteristics to the vehicle. It is also conceivable that the driver can command a change of gear via a gearshift lever.

Thereafter, or in connection with the reception of the gear-change message, the control unit 15 determines whether a change into a higher or a lower gear has been requested via a control unit 17 assigned to the gearbox 16. This control unit 17 that is assigned to the gearbox 16 is integrated either with the control unit 15, or communicates with the control unit 15, preferably via a data bus included in the vehicle.

Thereafter, the control unit 17 of the gearbox 16 issues a command; this meaning that a clutch means connecting the output shaft from the internal combustion engine to the output shaft from the gearbox 16 is to be disengaged.

Thereafter, the control unit 15 issues a control signal to the variable transmission 13. In the case that a gear change from a higher to a lower gear is to be performed, another control signal is generated from the control unit 15 that controls the gear ratio of the variable transmission 13 so that the gear ratio between the crankshaft and compressor is reduced. This causes the moment of inertia to be transferred from the compressor to the crankshaft resulting in an acceleration of the crankshaft.

By means of this method, the crankshaft rotational speed is changed into $R_{engine-adapted}$, the moment of inertia of the crankshaft into $J_{engine-adapted}=J_{engine-initial}+(delta)J$. The gear ratio of the variable transmission is changed from $G_{initial}$ to $G_{adapted}$, and the rotational speed of the compressor and the turbine into $R_{compressor-adapted}=R_{compressor-initial}*G_{adapted}/G_{initial}$, and thereby the moment of inertia of the compressor 4 and the turbine 3 is changed into $J_{compressor-adapted}=J_{compressor-initial}-(delta)J$.

In the case where a gear change from a lower to a higher gear is to be performed, another control signal is generated from the control unit 15 which controls the gear ratio of the variable transmission 13 so that the gear ratio between crankshaft and compressor is increased, wherein moment of inertia is transferred from the crankshaft to the compressor resulting in a retardation of the crankshaft.

By means of this method, the crankshaft rotational speed is changed into $R_{engine-adapted}$, the moment of inertia of the crankshaft into $J_{engine-adapted}=J_{engine-initial}-(delta)J$, the gear ratio of the variable transmission from $G_{initial}$ to $G_{adapted}$, and the rotational speed of the compressor and the turbine into $R_{compressor-adapted}=R_{compressor-initial}*G_{adapted}/G_{initial}$. By this, the moment of inertia of the compressor 4 and the turbine 3 is changed into $J_{compressor-adapted}=J_{compressor-initial}-(delta)J$.

When the rotational speed of the crankshaft has been adapted to the selected gear, the desired gear is engaged and clutch means connects the output shaft from the internal combustion engine to the output shaft from the gearbox.

In a preferred embodiment of the invention, the variable transmission 13 is designed as an infinitely variable transmission. Such transmissions have been disclosed, both in the U.S. Pat. No. 4,957,474 and in the journal Car, June 1991 p. 150–151, "Torotrak transmission," both of which are hereby expressly incorporated by reference.

What is claimed is:

1. An arrangement for regulating the rotational speed of a crankshaft included in an internal combustion engine during a gear changing process of a gearbox connected to the internal combustion engine, said arrangement comprising:
    a compressor mounted in connection with the air inlet of the internal combustion engine;
    a transmission having a variable gear ratio located between a crankshaft and a driving shaft arranged in connection with the compressor; and
    a control means arranged for controlling the gear ratio between the crankshaft and the compressor and which controls the gear ratio between crankshaft and compressor so that the gear ratio between these components is reduced when changing from a higher to a lower gear and a moment of inertia is transferred from the compressor to the crankshaft resulting in an acceleration of the crankshaft.

2. The arrangement as recited in claim 1, wherein the control means is further arranged for controlling the gear ratio between the crankshaft and the compressor so that the gear ratio between these components is increased when changing from a lower to a higher gear and wherein moment of inertia is transferred from the crankshaft to the compressor resulting in a retardation of the crankshaft.

3. A method for shift gears associated with an internal combustion engine, said method comprising:
    regulating the rotational speed of a crankshaft included in an internal combustion engine during a gear changing process of a gearbox connected to the internal combustion engine, the internal combustion engine comprising a compressor mounted in connection with an air inlet of the internal combustion engine, a transmission having a variable gear ratio arranged between the crankshaft and a driving shaft arranged in connection with the compressor, and a control unit arranged to control the gear ratio between the crankshaft and the compressor;
    receiving a gear changing command to the control unit;
    identifying that a gear change from a higher to a lower gear is to be performed; and
    generating another control signal from the control unit which controls the gear ratio between the crankshaft and the compressor so that the gear ratio between these components is reduced and wherein a moment of inertia is transferred from the compressor to the crankshaft resulting in an acceleration of the crankshaft.

4. The method as recited in claim 3, further comprising:
    identifying that a change of gear from a lower to a higher gear is to be performed; and
    generating another control signal from the control unit which controls the gear ratio between crankshaft and compressor so that the gear ratio between these components is increased, wherein moment of inertia is transferred from crankshaft to compressor resulting in a retardation of the crankshaft.

5. A gear changing process for a gearbox arranged at an internal combustion engine, the internal combustion engine comprising a crankshaft, a compressor mounted in connection with the air inlet of the internal combustion engine, a transmission having a variable gear ratio located between the crankshaft and a driving shaft arranged in connection with the compressor, and a control means which is arranged to control the gear ratio between the crankshaft and the compressor, the gear changing process comprising:
    receiving a gear changing command to the control means;
    disengaging clutch means which connects the internal combustion engine to the gearbox;
    identifying which one of a gear change from a higher to a lower gear, or from a lower to a higher gear is to be performed;
    generating another control signal from said control means which controls the gear ratio between crankshaft and compressor so that the gear ratio between these components is reduced in the case that a gear change from a higher to a lower gear is to be performed, and wherein moment of inertia is transferred from compressor to crankshaft resulting in an acceleration of the crankshaft;

generating another control signal from said control means which controls the gear ratio between crankshaft and compressor so that the gear ratio between these components increased in the case that a gear change from a lower to a higher gear is to be performed, and wherein moment of inertia is transferred from crankshaft to compressor resulting in a retardation of the crankshaft;

waiting until the crankshaft-rotational speed has been adapted to selected gear;

shifting into a new desired gear; and connecting the engine and the gearbox.

6. An arrangement for regulating the rotational speed of a crankshaft included in an internal combustion engine during a gear changing process of a gearbox connected to the internal combustion engine, said arrangement comprising:

a compressor mounted in connection with the air inlet of the internal combustion engine;

a transmission having a variable gear ratio located between the crankshaft and a driving shaft arranged in connection with the compressor; and a control means arranged to control the gear ratio between the crankshaft and the compressor, the control means being arranged to control the gear ratio between the crankshaft and the compressor so that the gear ratio between these components is reduced when changing from a higher to a lower gear and wherein moment of inertia is transferred from the compressor to the crankshaft resulting in an acceleration of the crankshaft.

7. An arrangement for regulating the rotational speed of a shaft driven by an engine during a gear changing process of a gearbox connected to the driven shaft, said arrangement comprising:

a rotary member connected to the shaft via a second gearbox having a variable gear ratio that is coupled to the shaft;

a control means for controlling the gear ratio of the variable gearbox, wherein energy transfer takes place from shaft to the rotary member or from the rotary member to the shaft, and whereby synchronization is enabled during the gear changing processes.

8. The arrangement as recited in claim 7, wherein the engine is constituted by an internal combustion engine comprising an air inlet and a compressor located in said air inlet, which compressor is driven by the shaft via the gearbox having a variable gear ratio.

9. The arrangement as recited in claim 7, wherein the gearbox has a variable gear ratio that exhibits an infinitely variable gear ratio.

* * * * *